United States Patent [19]
Muller et al.

[11] 4,193,978
[45] Mar. 18, 1980

[54] PRODUCTION OF HYDROGEN

[75] Inventors: Alain Muller, Le Havre; François Mathey, Vert le Petit; Jean Bensoam, Ballancourt, all of France

[73] Assignee: Compagnie Francaise de Raffinage, Paris, France

[21] Appl. No.: 810,616

[22] Filed: Jun. 27, 1977

[30] Foreign Application Priority Data

Jun. 28, 1976 [FR] France ............................ 76 19584
Dec. 15, 1976 [FR] France ............................ 76 37793

[51] Int. Cl.$^2$ ........................................... C01B 1/03
[52] U.S. Cl. ................................. 423/648 R; 423/286
[58] Field of Search ............ 423/648, 286, 289, 290, 423/296

[56] References Cited

U.S. PATENT DOCUMENTS

| | | | |
|---|---|---|---|
| 2,545,633 | 3/1952 | Schlesinger et al. | 423/286 |
| 3,419,361 | 12/1968 | Bratton | 423/648 X |
| 4,002,726 | 1/1977 | Filby | 423/648 X |

OTHER PUBLICATIONS

Nouveau Traite de Chimie, Minerale, vol. 2 by Pascal, p. 129, published by Masson et cie, Editors, 120 Boulevard Saint-Germain, Paris, 1966.
Libowitz, "Metal Hydrides for Thermal Energy Storage", Proceedings of the 9th Intersociety of Energy Convention Conference (Aug. 1974), pp. 322-325.
"A Course in General Chem." by McPherson & Henderson, 3rd Ed., 1927, pp. 303-307, Ginn & Co., N. Y.,

*Primary Examiner*—O. R. Vertiz
*Assistant Examiner*—Wayne A. Langel
*Attorney, Agent, or Firm*—Curtis, Morris & Safford

[57] ABSTRACT

Method of utilizing lithium borohydride for the storage and generation of hydrogen where the lithium borohydride is thermally decomposed to generate hydrogen and the remaining decomposition products (contaning boron in free or combined form and lithium in free or combined form) are hydrogenated from a separate source of hydrogen so as to reconstitute at least partially the composition as a hydrogen reserve. A further embodiment contemplates the utilization of aluminum in the composition which lowers the reconstitution temperature and increases the hydrogen capacity of the hydrogen reserve.

14 Claims, No Drawings

PRODUCTION OF HYDROGEN

The present invention relates to a combined hydrogen storage and production process and to applications of said process.

Growing energy needs have prompted specialists to recognize that traditional energy sources, such as coal, petroleum or natural gas, are not inexhaustible, or at least that they are becoming increasingly costly, and that it is advisable to consider replacing them gradually with other energy sources, such as nuclear energy, solar energy, or geothermal energy. Hydrogen, too, is being developed as an energy source.

Hydrogen may be used, for example, as fuel for internal combustion engines in place of hydrocarbons. This offers the advantage of eliminating atmospheric pollution through the formation of carbon oxides or of sulfur upon combustion of the hydrocarbons.

Hydrogen may also be used to fuel hydrogen-air fuel cells for production of the electricity needed by electric motors.

One of the problems posed by the use of hydrogen is its storage and transportation. A number of solutions have been proposed:

Hydrogen may be stored under high pressure in steel cylinders. But this approach has the drawback of requiring hazardous and heavy containers which are difficult to handle.

Hydrogen may also be stored in cryogenic containers. But this has the disadvantages associated with the handling of cryogenic liquids, as, for example, the high cost of the containers.

Another method of storing hydrogen is to store it in the form of a hydride, which then is decomposed at the proper moment to furnish the hydrogen. Iron-titanium, lanthanum-nickel and vanadium hydrides have been used in this manner, as has magnesium hydride, as described in French Pat. No. 1,529,371.

Lithium borohydride, $LiBH_4$, has also been used; which may be obtained by reacting lithium and boron, followed by hydrogenation (as described in German patent application No. 1,077,644). U.S. Pat. Nos. 3,450,638 and 3,419,361 describe hydrogen-generating compositions comprising a compound susceptible of decomposing exothermically, such as the hydrazine boranes, and a compound susceptible of decomposing endothermically, such as lithium borohydride.

In order that the use of a given hydride as a hydrogen reserve may be economically feasible, it must be possible to reconsitute said reserve with the products obtained upon the simultaneous decomposition of the hydride and production of hydrogen, without drawing on the products used at the outset to produce the hydride (which are not necessarily the same as those produced by the decomposition). This is particularly true of lithium borohydride.

The applicants have discovered that it is possible to reconstitute the reserve of lithium borohydride with the decomposition products of said borohydride.

The present invention thus has as an object a combined hydrogen production and storage process.

A preferred embodiment of the present invention is a combined process for the storage and production of hydrogen from a hydrogen reserve comprising lithium borohydride by decomposition of at least part of said borohydride to hydrogen and a composition containing boron in free or combined form and lithium in free or combined form, said process being characterized by the fact that the composition containing boron and lithium obtained upon the production of hydrogen is hydrogenated so as to reconstitute the hydrogen reserve at least partially.

In connection with this first embodiment of the invention and in the remainder of this specification, lithium borohydride means a compound of formula $Li\ B\ H_x$ with $0 < x < 4$. The exact formula of the reconstituted compound has not been established. However, the compound is capable of again furnishing hydrogen.

Another embodiment of this invention is the application of the process in accordance with the invention to the propulsion of motor vehicles as well as to stationary hydrogen reserves, such as compressor reserves.

The hydrogen production step from the lithium borohydride reserve consists of a decomposition of said borohydride which, according to the literature, occurs in accordance with a reaction of the following type, when $x=4$:

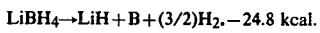
$$LiBH_4 \rightarrow LiH + B + (3/2)H_2. - 24.8\ kcal.$$

This decomposition may be incomplete and the composition obtained may contain a certain amount of undecomposed borohydride. It is also possible that the boron and the lithium are present in the composition obtained, not in the form of metallic boron, lithium hydride (LiH), or lithium borohydride ($LiBH_4$) but in the form of other compounds, hydrogenated or not hydrogenated, of boron and/or lithium.

The decomposition reaction may be carried out by heating borohydride to a temperature comprised between 200 and 500° C., and at a pressure of 100 bars or less.

In order to secure as complete a decomposition of the lithium borohydride as possible, it is particularly advantageous to operate at a temperature comprised between 350° and 450° C. and a pressure of less than 10 bars.

The applicants have found that the purity of the hydrogen produced by the decomposition of lithium borohydride is very high and that this hydrogen does not contain volatile derivatives of boron.

The process in accordance with the present invention is characterized by the fact that the composition containing boron and lithium may be used to reconstitute the lithium borohydride reserve, which of course is very advantageous as it obviates the need for using new starting materials.

Reconstitution of the lithium borohydride is effected by hydrogenation of the composition containing boron and lithium at a temperature comprised between 300° and 750° C. and a pressure comprised between 0.1 and 200 bars, and preferably between 1 and 200 bars.

The applicants have found that it is preferable to carry out the hydrogenation at a temperature comprised between 600° and 650° C. and at a pressure comprised preferably between 100 and 160 bars.

In the process in accordance with the invention, the hydrogen reserve comprising lithium borohydride may further advantageously contain aluminum.

The addition of aluminum to the lithium borohydride permits bothlowering the reconstitution temperature of the hydrogen reserve and increasing the hydrogen capacity of the hydrogen reserve, which obviously improves the economy of the process.

The amount of the aluminum, expressed in weight percent of the reserve, may be comprised between 0.1 and 99.9% and is preferably between 0.5 and 50%.

The reserve may be obtained particularly by mechanically mixing lithium borohydride and aluminum in the metallic state. This reserve is then decomposed to furnish hydrogen and then is rehydrogenated.

The aluminum may also be incorporated in the reserve by mixing it with the decomposition products of the lithium borohydride.

If, before the first decomposition-hydrogenation cycle, the aluminum is in the metallic state, the state in which it will be after this first cycle is not known exactly, similar to the state in which the boron and the lithium will be.

The applicants have observed that when a reserve formed of lithium borohydride and aluminum is used at the start and the supply is decomposed, then reconstituted by being hydrogenated, and again decomposed, the volume of hydrogen obtained is greater than that which would be obtained at the end of the same sequence of operations from the lithium borohydride contained in the reserve at the outset. This increase in the hydrogen capacity of the supply is not fully understood by the applicants. It would seem that the aluminum also participates in the storage, for example, as aluminum borohydride, $Al(BH_4)_3$.

In addition to increasing the hydrogen capacity, the introduction of aluminum into the reserve makes it possible to lower the reconstitution temperature of the hydrogen reserve substantially.

This reconstitution temperature may also be at 200° C. or higher and is preferably 300° C. or higher.

The pressure may be comprised between 0.1 and 200 bars absolute and is preferably comprised between 10 and 200 bars absolute.

The operating conditions for decomposition of the reserve, and hence for production of the hydrogen, are in the neighborhood of those employed when the reserve does not contain aluminum. The temperature may be comprised between 200° and 550° C. and is preferably 10 bars absolute or less.

It is desirable that the hydrogen used to recharge the reserve not contain appreciable amounts of compounds susceptible of reacting with boron or lithium, thereby diminishing the quantity of lithium borohydride. These compounds may be water, carbon monoxide, carbon dioxide gas and oxygen, for example, or sulfur compounds.

The lithium borohydride contained in the initial hydrogen reserve, that is to say, in the reserve not already used for the production of hydrogen, may be prepared in accordance with the process described in German patent application No. 1,077,644, mentioned earlier. This process consists in hydrogenation of a mixture of boron and lithium at a temperature comprised between 350° and 1000° C. and at a pressure comprised between 30 and 500 bars.

The process in accordance with the invention may be applied particularly to the storage of the hydrogen required for the propulsion of motor vehicles. These vehicles may be powered by internal-combustion engines or electric motors, with the hydrogen in the latter case feeding a fuel cell.

In the case of internal-combustion engines, the temperature of the exhaust gases is sufficiently high to permit the decomposition of the lithium borohydride, and therefore the supplying of the engine with hydrogen.

Moreover, since the weight percent of the available hydrogen may be greater than 10%, lithium borohydride competes successfully with other possible sources of hydrogen for the propulsion of motor vehicles, such as pressurized cylinders, cryogenic containers, or other hydrides.

The process in accordance with the invention may also be applied to the storage of hydrogen in stationary reserves, such as hydrogen compressor reserves, and to the reconstitution of said reserves after use.

The examples which follow, which are given, not by way of limitation but by way of illustration of the invention, relate to decomposition cycles of reserves in accordance with the invention and to hydrogenation cycles of the products of decomposition of said reserves.

EXAMPLE 1

This example relates to decomposition cycles of a reserve formed of lithium borohydride and to hydrogenation cycles of the composition obtained upon decomposition of said borohydride.

5 g of $LiBH_4$ is placed in an autoclave. After placing it under vacuum, decomposition is carried out over 24 hours at 450° C. and a pressure of about $10^{-2}$ mm Hg. In this example, decomposition is always carried out under these conditions.

As pointed out earlier, one of the decomposition reactions of lithium borohydride is $$LiBH_4 \rightarrow LiH + B + (3/2)H_2.$$

The quantity of hydrogen contained in $LiBH_4$ is equal to 18.4% by weight of the hydride. The decomposition of $LiBH_4$ can only furnish a quantity of hydrogen representing at the most 13.8% by weight of the hydride, the rest, 4.6%, remaining in the form of LiH.

This 13.8% represents approximately 7.7 normal liters of hydrogen (measured at 0° C. and 1 bar absolute) for 5 g of $LiBH_4$.

The quantity of hydrogen evolved upon decomposition is measured, and the composition obtained is then subjected to hydrogenation. Several decomposition-reaction and hydrogenation-reaction cycles are carried out.

Seven tests, A, B, C, D, E, F and G, were run under different hydrogenation-reaction conditions. The results of these tests are presented in Table 1 which follows.

Table 1

| TEST | | A | B | C | D | E | F | G |
|---|---|---|---|---|---|---|---|---|
| Hydrogenation reaction | Duration (hr.) | 48 | 48 | 48 | 48 | 48 | 48 | 48 |
| | Temperature (°C.) | 650 | 650 | 650 | 450 | 500 | 550 | 600 |

Table 1-continued

| TEST | | | A | B | C | D | E | F | G |
|---|---|---|---|---|---|---|---|---|---|
| conditions | Pressure (bars) | | 130 | 190 | 150 | 150 | 150 | 150 | 150 |
| Volume of hydrogen evolved, after 24 hours, upon decomposition (in normal liters) per 5 g of LiBH4 | Decomposition No. | 1st | 6.75 | 6.22 | 6.65 | 6.525 | 7.0 | 6.3 | 6.7 |
| | | 2nd | 4.75 | 4.98 | 5.65 | 2.4 | 3.90 | 3.625 | 5.07 |
| | | 3rd | 4.50 | 4.92 | 5.53 | | | | 5.4 |
| | | 4th | 4.90 | 3.925 | 5.25 | | | | 5.20 |

It should be noted that the quantity of hydrogen evolved upon the first decomposition effected with the starting borohydride, LiBH4, may vary from one test to the next. This may be explained by the entrainment of borohydride into the cold parts of the apparatus, these entrained amounts being undecomposed, or by incomplete decomposition of the lithium borohydride.

From these results it is apparent that the decomposition reaction is reversible, particularly insofar as tests A, C and G are concerned. In tests A, B, C and G, four cycles were run. In tests D, E and F, only two cycles were run. It may be seen that the volume of recharged hydrogen is substantially equal to the volume evolved, except for the first recharge, and that the best results are obtained with temperatures of 650° and 600° C. and a pressure of 150 bars.

The quantities of evolved or fixed hydrogen are measured by thermogravimetry. The volumes of evolved hydrogen may also be measured.

The results of the tests performed are given in the following table, which showsthe compositions of the reserves before the first decomposition;

the operating conditions for the individual decompositions and hydrogenations, namely, pressure P in bars, temperature T in °C., and duration D in hours; and the weight percents of evolved hydrogen (HE), in relation to the weight of the lithium borohydride contained in the reserve at the start (HE$_1$) and in relation to the total weight of the reserve (lithium borohydride & aluminium) at the start (HE$_2$), after each decomposition, as well as the weight percent of fixed hydrogen (HF), in relation to the weight of the reserve at the start.

| | Composition of reserve in wt. % before 1st decomposition | | 1st decomposition | | | HE (wt. %) | | 1st hydrogenation | | | HF (wt. %) | 2nd decomposition | | | HE (wt. %) | | 2nd hydrogenation | | | HF (wt. %) |
|---|---|---|---|---|---|---|---|---|---|---|---|---|---|---|---|---|---|---|---|---|
| Test No. | LiBH4 | Al | bars P | °C. T | hrs D | HE$_1$ | HE$_2$ | P | T | D | | P | T | D | HE$_1$ | HE$_2$ | P | T | D | |
| H | | | 1×10$^{-5}$ | 450 | 12 | 13.8 | 12.4 | 150 | 650 | 12 | 15.2 | 1 | 416 | 10 | 16.6 | 15 | | | | |
| I | | | 1×10$^{-5}$ | 450 | 12 | 13.8 | 12.4 | 150 | 650 | 12 | 15.2 | 1 | 416 | 1.3 | 5.5 | 5 | 10 | 416 | 0.15 | 0.6 |
| | 90 | 10 | | | | | | | | | | | | | | | | | | |
| J | | | 1 | 373 | 0.8 | 3.3 | 3 | 80 | 373 | 0.1 | 0.6 | | | | | | | | | |
| K | | | 1 | 432 | 0.1 | 2.75 | 2.5 | 10 | 432 | 0.1 | 2.5 | | | | | | | | | |
| L | 80 | 20 | 1×10$^{-5}$ | 450 | 12 | 13.8 | 11 | 150 | 650 | 12 | 13.7 | 1 | 375 | 20 | 17.5 | 14 | | | | |
| M | | | 1×10$^{-5}$ | 450 | 12 | 13.8 | 9.7 | 150 | 650 | 12 | 13.2 | 1 | 402 | 10 | 17.9 | 12.5 | | | | |
| N | | | 1×10$^{-5}$ | 450 | 12 | 13.8 | 9.7 | 150 | 650 | 12 | 13.2 | 1 | 402 | 3 | 12.7 | 8.9 | 10 | 402 | 0.2 | 2 |
| | 70 | 30 | | | | | | | | | | | | | | | | | | |
| O | | | 1×10$^{-5}$ | 450 | 12 | 13.8 | 9.7 | 150 | 650 | 12 | 13.2 | 1 | 374 | 3.6 | 5.7 | 4 | 10 | 374 | 0.25 | 0.7 |
| P | | | 1×10$^{-5}$ | 450 | 12 | 13.8 | 9.7 | 150 | 650 | 12 | 13.2 | 1 | 309 | 1 | 1.4 | 1 | 10 | 309 | 0.25 | 0.35 |
| Q | | | 1×10$^{-5}$ | 450 | 12 | 13.8 | 8.3 | 150 | 650 | 12 | 12.2 | 1 | 385 | 5 | 5.8 | 3.5 | 80 | 385 | 0.30 | 1.5 |
| | 60 | 40 | | | | | | | | | | | | | | | | | | |
| R | | | 1×10$^{-5}$ | 450 | 12 | 13.8 | 8.3 | 150 | 650 | 12 | 12.2 | 1 | 385 | 16 | 19 | 11.4 | | | | |

EXAMPLE 2

This example relates to decomposition cycles of a reserve formed of lithium borohydride and aluminum, and to hydrogenation cycles of the decomposition products of said reserve.

5 g of lithium borohydride and varying amounts of aluminum are mixed mechanically. The mixtures obtained are then subjected to decomposition-rehydrogenation cycles under varying conditions of pressure and temperature. The weight percent of evolved hydrogen is determined for each decomposition, and the weight percent of fixed hydrogen for each hydrogenation.

It is apparent from that table that the capacity of the hydrogen reserve is increased by the addition of aluminum, and that the reserve may be reconstituted at least partially at temperatures of about 300° C.

We claim:

1. In a combined process for the storage and generation of hydrogen from a hydrogen reserve comprising lithium borotetrahydride by decomposition of at least part of said borotetrahydride into hydrogen and a composition comprising boron in free or combined form and lithium in free or combined form, the improvement in said process for reusable hydrogen storage comprising driving the decomposition of the lithium borotetrahydride to generate more than one mole of free hydrogen per mole of lithium borotetrahydride and thereafter hydrogenating the composition comprising boron and lithium obtained upon the generation of hydrogen so as to reconstitute the hydrogen reserve at least partially, and thereafter generating more than one mole of free hydrogen per mole of lithium borotetrahydride from the reconstituted hydrogen reserve.

2. Process as defined in claim 1, wherein said reserve comprising lithium borohydride further contains aluminum.

3. Process as defined in claim 2, wherein the hydrogen reserve contains from 0.5 to 50%, by weight of aluminum.

4. Process as defined in claim 3, wherein the hydrogen is generated at a temperature between 300° and 450° C. and at a pressure of 10 bars absolute or less.

5. Process as defined in claim 4, wherein the hydrogen reserve is reconstituted at a temperature of 200° C. or higher.

6. Process as defined in claim 5, wherein the hydrogen reserve is reconstituted at a pressure between 0.1 and 200 bars absolute.

7. Process as defined in claim 1, wherein the hydrogen is generated at a temperature between 200° and 500° C., and at a pressure of 100 bars or less.

8. Process as defined in claim 7, wherein the reconstitution of the hydrogen reserve supply is effected at a temperature comprised between 300° and 750° C. and wherein the reconstitution of the hydrogen supply is effected at a pressure comprised between 0.1 and 200 bars.

9. Process as defined in claim 7, wherein the reconstitution of the hydrogen reserve supply is effected at a temperature comprised between 600° and 650° C. and wherein the reconstitution of the hydrogen supply is effected at a pressure comprised between 100 and 160 bars.

10. Process as defined in claim 1, wherein the reconstitution of the hydrogen reserve supply is effected at a temperature comprised between 300° and 750° C. and wherein the reconstitution of the hydrogen supply is effected at a pressure comprised between 0.1 and 200 bars.

11. In a combined process for the storage and generation of hydrogen from a hydrogen reserve comprising lithium borotetrahydride by decomposition of at least part of said borotetrahydride into hydrogen and a composition comprising free boron and lithium hydride, the improvement in said process for reusable hydrogen storage comprising hydrogenating the composition containing boron and lithium hydride obtained upon the generation of hydrogen so as to reconstitute the hydrogen reserve at least partially.

12. Process as defined in claim 11, wherein the hydrogen is generated at a temperature between 350° and 450° C., and at a pressure of 10 bars or less.

13. Process as defined in claim 11, wherein said reserve comprising lithium borohydride further contains aluminum.

14. In a combined process for the storage and generation of hydrogen from a hydrogen reserve comprising lithium borotetrahydride by decomposition of at least part of said borotetrahydride into hydrogen and a composition comprising boron in free or combined form and lithium in free or combined form, the improvement in said process for reusable hydrogen storage comprising driving the decomposition of the lithium borotetrahydride to generate more than one mole of free hydrogen per mole of lithium borotetrahydride while thereby decomposing a significant portion of any lithium borodihydride formed during decomposition and thereafter hydrogenating the decomposition products of boron and lithium obtained from the foregoing generation of hydrogen, specifically including the lithium and boron decomposition products of lithium borodihyride, so as to reconstitute the hydrogen reserve at least partially.

* * * * *